United States Patent
Suzuki et al.

(10) Patent No.: US 9,847,684 B2
(45) Date of Patent: Dec. 19, 2017

(54) STATOR AND ROTATING ELECTRIC MACHINE

(71) Applicant: DENSO CORPORATION, Kariya, Aichi-pref. (JP)

(72) Inventors: Hideaki Suzuki, Toyoake (JP); Masahiro Seguchi, Obu (JP); Yuki Takahashi, Obu (JP)

(73) Assignee: DENSO CORPORATION, Kariya (JP)

( * ) Notice: Subject to any disclaimer, the term of this patent is extended or adjusted under 35 U.S.C. 154(b) by 664 days.

(21) Appl. No.: 14/069,677

(22) Filed: Nov. 1, 2013

(65) Prior Publication Data
US 2014/0125185 A1 May 8, 2014

(30) Foreign Application Priority Data
Nov. 2, 2012 (JP) .................. 2012-242832

(51) Int. Cl.
*H02K 3/28* (2006.01)
*H02K 3/14* (2006.01)

(52) U.S. Cl.
CPC .............. *H02K 3/28* (2013.01); *H02K 3/14* (2013.01)

(58) Field of Classification Search
CPC ...................................... H02K 3/28
USPC .............................. 310/198, 201
IPC ...................................... H02K 3/28
See application file for complete search history.

(56) References Cited

U.S. PATENT DOCUMENTS

| | | | |
|---|---|---|---|
| 6,657,352 B1 * | 12/2003 | Asao .................. | H02K 1/16 310/180 |
| 6,894,417 B2 * | 5/2005 | Cai .................... | H02K 3/12 310/184 |
| 6,969,938 B2 * | 11/2005 | Seguchi .............. | H02K 3/12 310/180 |
| 7,348,705 B2 * | 3/2008 | Cai .................... | H02K 3/28 310/184 |
| 7,923,884 B2 * | 4/2011 | Seguchi .............. | H02K 3/12 310/180 |

(Continued)

FOREIGN PATENT DOCUMENTS

| | | |
|---|---|---|
| JP | 2004-088993 | 3/2004 |
| JP | 2009-153367 | 7/2009 |

(Continued)

OTHER PUBLICATIONS

Office Action (1 page) dated Nov. 18, 2014 issued in corresponding Japanese Application No. 2012-242832 and English translation (2 pages).

*Primary Examiner* — John K Kim

(74) *Attorney, Agent, or Firm* — Nixon & Vanderhye P.C.

(57) ABSTRACT

A stator includes a hollow cylindrical stator core and a stator coil. The stator core has a plurality of slots formed therein. The stator coil is provided in the slots of the stator core in a plurality of layers in a radial direction of the stator core, and includes a first winding and a second winding. The first winding extends around the stator core so as to be located at the (2n−1)th and 2nth layers of the stator coil, and has an end located at the 2nth layer, where n is a natural number. The second winding extends around the stator core so as to be located at the (2n+1)th and (2n+2)th layers of the stator coil, and has an end located at the (2n+1)th layer. The ends of the first and second windings, which are respectively located at the 2nth and (2n+1)th layers, are electrically connected to each other.

9 Claims, 10 Drawing Sheets

(56) References Cited

U.S. PATENT DOCUMENTS

| | | | |
|---|---|---|---|
| 2001/0011852 A1* | 8/2001 | Nakamura | H02K 3/34 310/215 |
| 2002/0011753 A1* | 1/2002 | Asao | H02K 3/50 310/45 |
| 2004/0000832 A1 | 1/2004 | Isogai et al. | |
| 2004/0061400 A1* | 4/2004 | Fukushima | H02K 3/28 310/184 |
| 2005/0206263 A1* | 9/2005 | Cai | H02K 3/12 310/198 |
| 2007/0018525 A1* | 1/2007 | Cai | H02K 3/28 310/184 |
| 2008/0246348 A1* | 10/2008 | Angelis | H02K 41/02 310/12.22 |
| 2009/0140594 A1 | 6/2009 | Ogawa et al. | |
| 2010/0013341 A1* | 1/2010 | Vollmer | H02K 3/18 310/189 |
| 2010/0148620 A1 | 6/2010 | Ishizuka et al. | |
| 2011/0175483 A1* | 7/2011 | Koike | H02K 3/12 310/201 |
| 2013/0300244 A1* | 11/2013 | Kashihara | H02K 3/28 310/184 |
| 2014/0125185 A1* | 5/2014 | Suzuki | H02K 3/28 310/198 |
| 2015/0061470 A1* | 3/2015 | Sekiyama | H02K 3/28 310/60 R |

FOREIGN PATENT DOCUMENTS

| | | |
|---|---|---|
| JP | 2010-166803 | 7/2010 |
| JP | 2012-029399 | 2/2012 |

* cited by examiner

STATOR AND ROTATING ELECTRIC MACHINE

CROSS-REFERENCE TO RELATED APPLICATION

This application is based on and claims priority from Japanese Patent Application No. 2012-242832, filed on Nov. 2, 2012, the content of which is hereby incorporated by reference in its entirety into this application.

BACKGROUND OF THE INVENTION

1 Technical Field of the Invention

The present invention relates to a stator which has a stator core and a stator coil mounted on the stator core, and to a rotating electric machine which employs the stator.

2 Description of the Related Art

Japanese Unexamined Patent Application Publication No. 2009-153367 discloses a technique for suppressing increase in size of a stator and preventing the performance of the stator from being lowered when the stator is used in a rotating electric machine.

Specifically, according to the technique, the stator has a stator core having a plurality of slots formed therein and a multi-phase stator coil comprised of a plurality of phase-windings. Each of the phase-windings is formed by serially connecting first and second windings wound on the stator core so that the winding direction of the phase-winding is reversed at a return portion between the first and second windings. Moreover, each of the phase-windings includes a plurality of in-slot portions, which are received in corresponding ones of the slots of the stator core, and a plurality of turn portions that connect adjacent pairs of the in-slot portions and are located alternately on opposite axial sides of the stator core. Furthermore, those of the turn portions which are located at the same circumferential position as that one of the turn portions which is immediately connected to one end of the return portion are radially shifted further, in a direction away from a rotor of the rotating electric machine, than the in-slot portions connected by the those turn portions.

However, from the above patent document, it is unclear whether the lengths of the phase-windings of the stator coil are equal to each other. Accordingly, it is also unclear whether the voltage drops across the phase-windings are equal to each other.

In addition, it is disclosed in the above patent document that the phase-windings are Y-connected (or star-connected) to form the stator coil. However, it is unclear whether the once Y-connected phase-windings can be disassembled and then reconnected into other connections (e.g., a Δ connection or a Y-Δ connection) for changing the inductance of the stator coil.

SUMMARY

According to an embodiment, there is provided a stator which includes a hollow cylindrical stator core and a stator coil. The stator core has a plurality of slots formed therein. The slots are arranged in a circumferential direction of the stator core at predetermined intervals. The stator coil is provided in the slots of the stator core in a plurality of layers in a radial direction of the stator core. The stator coil includes a first winding and a second winding. The first winding extends around the stator core so as to be located at the (2n−1)th and 2nth layers of the stator coil counting from a radially outer side of the stator coil, where n is a natural number. The first winding has an end located at the 2nth layer. The second winding extends around the stator core so as to be located at the (2n+1)th and (2n+2)th layers of the stator coil. The second winding has an end located at the (2n+1)th layer. The ends of the first and second windings, which are respectively located at the 2nth and (2n+1)th layers, are electrically connected to each other.

In a further implementation, each of the first and second windings is formed by connecting a plurality of electric conductors inserted in the slots of the stator core. Each of the first and second windings includes a plurality of in-slot portions, which are received in corresponding ones of the slots of the stator core, and a plurality of turn portions that connect adjacent pairs of the in-slot portions and are located outside of the slots of the stator core.

Preferably, the ends of the first and second windings are electrically connected to each other via an irregular-shaped electric conductor that is different in shape from the electric conductors forming the first and second windings.

Preferably, each of the turn portions of the first and second windings is stair-shaped so that the turn portion has a maximum protruding height from a corresponding axial end face of the stator core at a center of the turn portion.

Further, each of the stair-shaped turn portions of the first and second windings includes a plurality of steps. It is preferable that each of the steps has a height substantially equal to a thickness of the electric conductors forming the first and second windings.

Preferably, each of the electric conductors forming the first and second windings is configured to include an electrically-conductive metal member having a substantially rectangular cross section and an insulating coat that covers the metal member.

It is also preferable that each of the turn portions of the first and second windings has a crank-shaped portion formed therein.

In a still further implementation, the stator coil is configured as a multi-phase coil to include a plurality of phase windings. Each of the phase windings includes first and second windings as described above. For every 2m layers of the stator coil, there are formed terminals at the ends of the first and second windings of the phase windings, where m is a natural number. The phase windings are connected into one of a Y-connection, a Δ connection and a Y-Δ connection by connecting corresponding pairs of the terminals.

According to the embodiment, there is also provided a rotating electric machine which includes the above-described stator and a rotor that is rotatably disposed in radial opposition to the stator.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
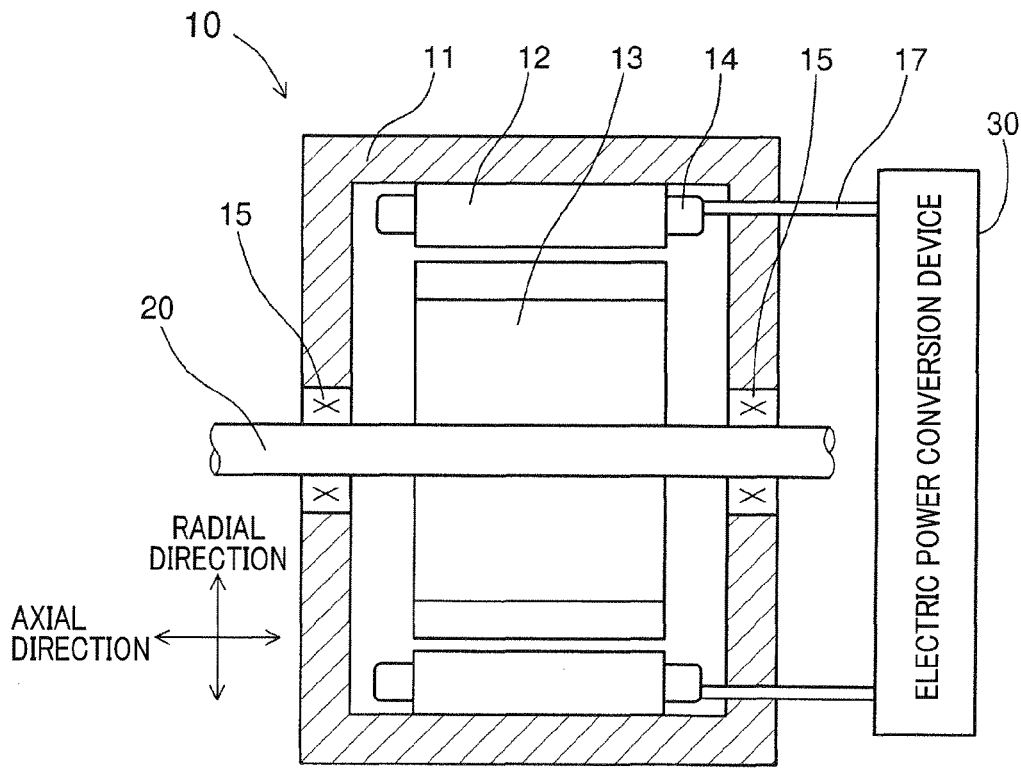
FIG. 1 is a partially cross-sectional schematic view illustrating the overall configuration of a rotating electric machine which includes a stator according to an exemplary embodiment.

FIG. 1 shows the overall configuration of a rotating electric machine 10 which includes a stator 12 according to an exemplary embodiment. In this embodiment, the rotating electric machine 10 is configured as an inner rotor-type motor generator for use in a motor vehicle.

As shown in FIG. 1, the rotating electric machine 10 includes, in addition to the stator 12, a rotor 13 that is rotatably disposed radially inside of the stator 12 and a housing 11 that has both the stator 12 and the rotor 13 received therein. The rotating electric machine 10 is electrically connected to an electric power conversion device 30 via input/output lines 17.

The housing 11 of the rotating electric machine 10 may be integrally formed with a housing of the electric power conversion device 30. Otherwise, the housing 11 of the rotating electric machine 10 may be formed separately from and then fixed to the housing of the electric power conversion device 30 via at least one of the following fixing means: a bolt-nut engagement, a male thread-female thread engagement, a through-hole-split cotter pin engagement, welding and crimping. In addition, the input/output lines 17 may be formed by extending electric conductors 16 which will be described in detail later.

The housing 11 rotatably supports a rotating shaft 20 via a pair of bearings 15. The rotor 13 is fixed on the rotating shaft 20 via at least one of the above-described fixing means, so that the rotor 13 rotates together with the rotating shaft 20. In addition, it should be noted that the rotor 13 may also be integrally formed with the rotating shaft 20.

Figure 2:
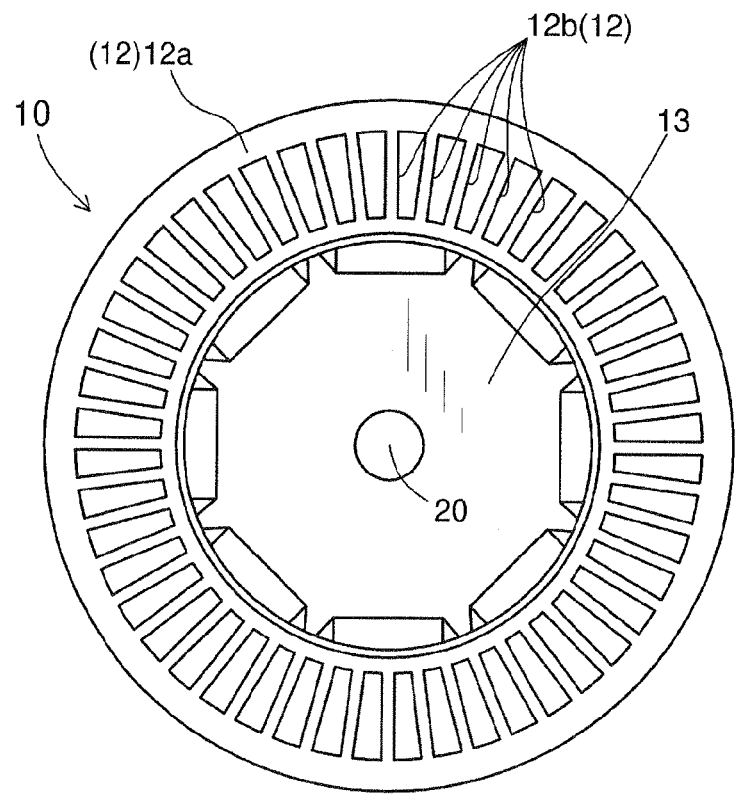
FIG. 2 is a plan view illustrating the configuration of the stator.
Figure 3:
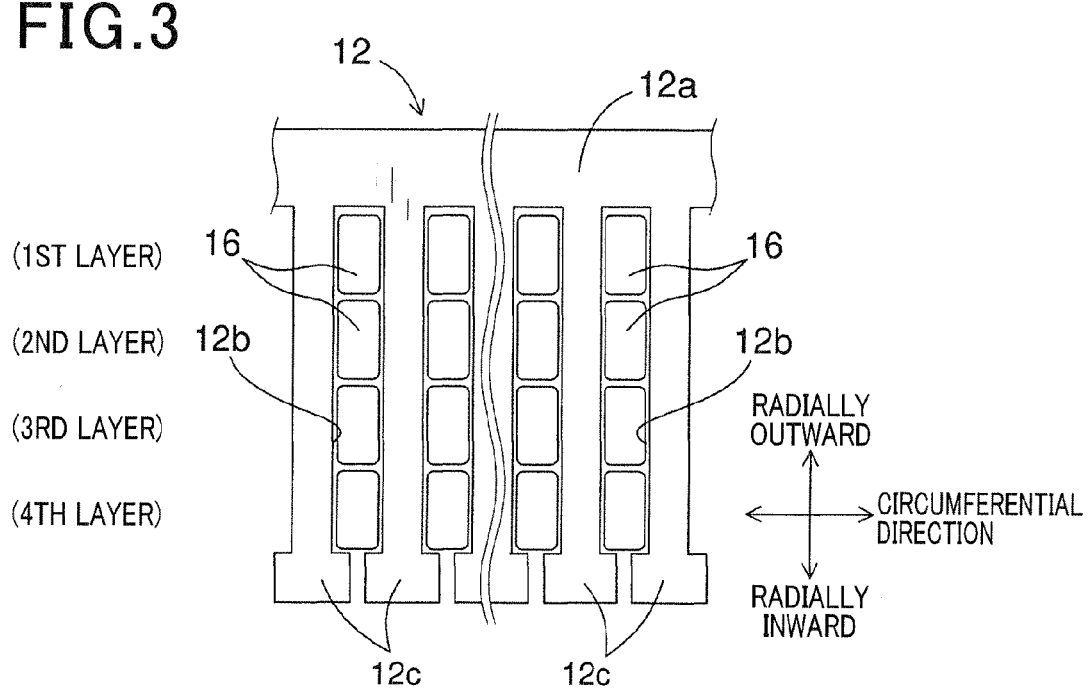
FIG. 3 is an enlarged plan view of part of the stator.

Referring further to FIGS. 2 and 3, the stator 12 includes a hollow cylindrical stator core 12a that is disposed so as to surround the rotor 13 and fixed to the housing 11 of the rotating electric machine 10 via at least one of the above-described fixing means. The stator core 12a has a plurality of slots 12b formed therein. The slots 12b are arranged in the circumferential direction of the stator core 12a at predetermined intervals. Moreover, between each circumferentially-adjacent pair of the slots 12b, there is formed one stator tooth 12c so as to extend in a radial direction of the stator core 12a.

In addition, in terms of making the flow of magnetic flux uniform and thereby increasing the torque of the rotating electric machine 10, it is preferable to arrange the slots 12b in the circumferential direction of the stator core 12a at equal intervals.

In the present embodiment, the slot multiplier number S is set to 2; the number Mn of magnetic poles of the rotor 13 is set to 8; the number p of phases of the rotating electric machine 10 is set to 3. Consequently, the number Sn of the slots 12b formed in the stator core 12a is equal to 48 (i.e., Sn=S×Mn×p=2×8×3=48).

In each of the slots 12b of the stator core 12a, there are received a plurality (e.g., four) of electric conductors 16 for forming a stator coil of the stator 12; the electric conductors 16 are radially aligned with each other in the slot 12b. In other words, in each of the slots 12b, there are provided the electric conductors 16 in four layers in the radial direction of the stator core 12a. Hereinafter, for the sake of convenience of explanation, the four layers will be respectively referred to as the first, second, third and fourth layers from the radially outer side.

Figure 4:
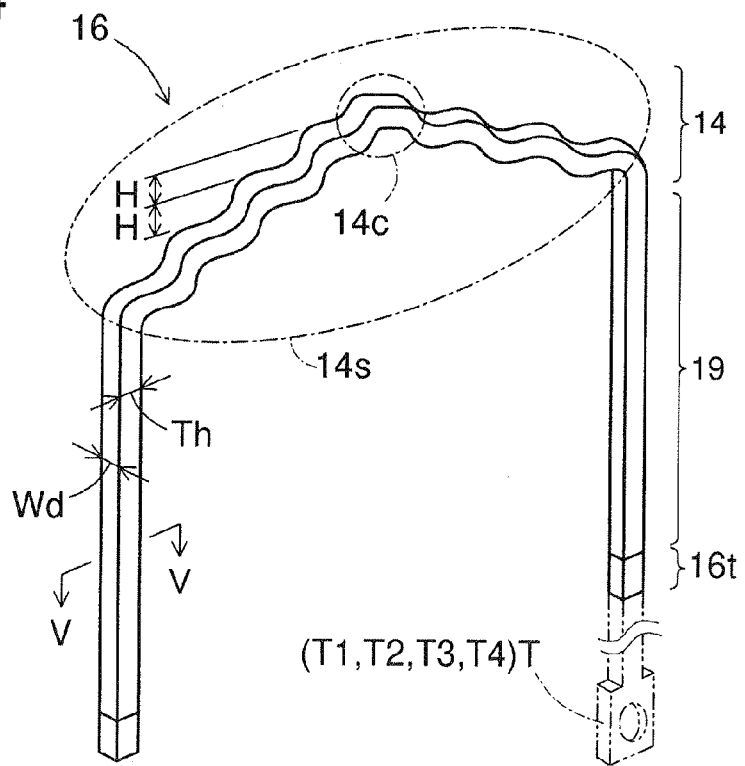
FIG. 4 is a perspective view of an electric conductor used for forming a stator coil of the stator.
Figure 8:
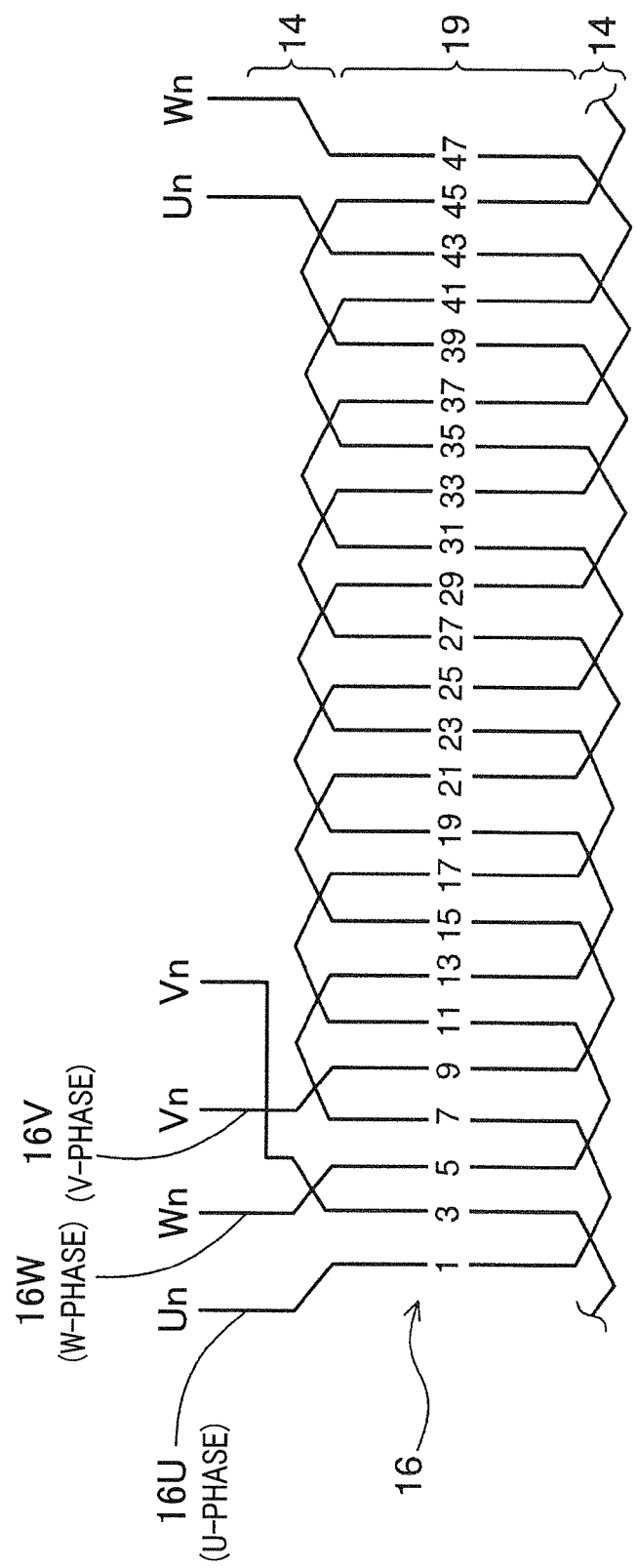
FIG. 8 is a schematic view illustrating the wave-wound configuration of the windings for forming the stator coil.

As shown in FIG. 4, the electric conductors 16 include in-slot portions 19, which are received in corresponding ones of the slots 12b of the stator core 12a, and turn portions 14 that connect adjacent pairs of the in-slot portions 19 and protrude outside of the slots 12b (see also FIG. 8). All the turn portions 14 of the electric conductors 16 on the same axial side of the stator core 12a together make up one coil end part of the stator coil. In addition, some of the turn portions 14 are extended toward the electric power conversion device 30 shown in FIG. 1 so as to make up the input/output lines 17.

The detailed configuration of the electric conductors 16 will be described hereinafter with reference to FIGS. 4 and 5.

In the present embodiment, each of the electric conductors 16 is substantially U-shaped to include a pair of in-slot portions 19 extending parallel to each other, one turn portion 14 connecting the pair of in-slot portions 19, and distal end portions 16t on the opposite side to the turn portion 14.

The turn portion 14 includes a stair-shaped portion 14s having a plurality of steps. In the present embodiment, the height H of each step of the stair-shaped portion 14s is set to be substantially equal to the thickness Th of the electric conductors 16.

Setting the height H as above, it is possible to easily stack the turn portions 14 of the electric conductors 16 in the axial direction of the stator core 12a.

In addition, the number of steps of the stair-shaped portion 14s can be set to any suitable number according to the interval between the pair of in-slot portions 19 connected by the turn portion 14.

Further, at the center of the stair-shaped portion 14s, there is formed a crank-shaped portion 14c for radially shifting the electric conductor 16. The crank-shaped portion 14c has the maximum protruding height from a corresponding axial end face of the stator core 12a in the electric conductor 16. In the present embodiment, the amount of radial shift realized by the crank-shaped portion 14c is set to be substantially equal to the width Wd of the electric conductors 16.

Setting the amount of radial shift as above, it is possible to easily shift the electric conductor 16 so as to densely arrange the turn portions 14 of the electric conductors 16 in the radial direction of the stator core 12a.

In addition, it should be noted that the turn portion 14 may have the crank-shaped portion 14c formed at the center thereof without having the stair-shaped portion 14s formed therein.

Some of the distal end portions 16t of the electric conductors 16 have a terminal T (i.e., T1, T2, T3 or T4) formed thereat, as shown in FIG. 4. Corresponding pairs of the distal end portions 16t of the electric conductors 16 and corresponding pairs of the distal end portions 16t and the terminals T are joined by, for example, soldering or welding. In addition, the welding may be fusion welding (e.g., gas welding, arc welding, electroslag welding, electron beam welding or laser beam welding) or pressure welding (e.g., resistance welding or forge welding).

Figure 5:
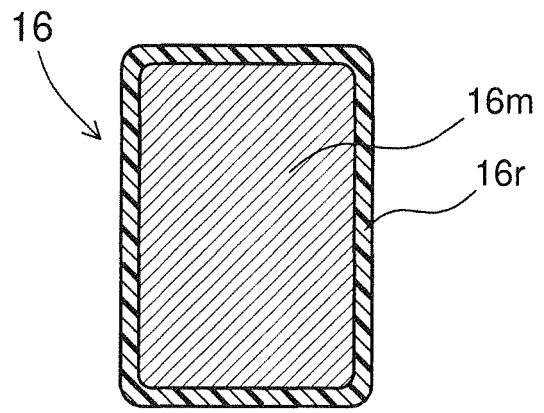
FIG. 5 is a cross-sectional view taken along the line V-V in FIG. 4.

Moreover, as shown in FIG. 5, each of the electric conductors 16 is configured to include an electrically-conductive metal member (e.g., a copper wire segment) 16m and an insulating coat 16r (e.g., a resin coat). The metal member 16m has a substantially rectangular cross section perpendicular to the extending direction of the electric conductor 16. The insulating coat 16r is formed to cover only those portions of the metal member 16m which make up the turn portion 14 and in-slot portions 19 of the electric conductor 16. On the other hand, those portions of the metal member 16m which make up the distal end portions 16t of the electric conductor 16 are exposed from (i.e., not covered by) the insulating coat 16r.

Furthermore, in the present embodiment, a plurality of irregular-shaped electric conductors 16d are used for making inter-layer connection between the electric conductors 16.

Figure 6:
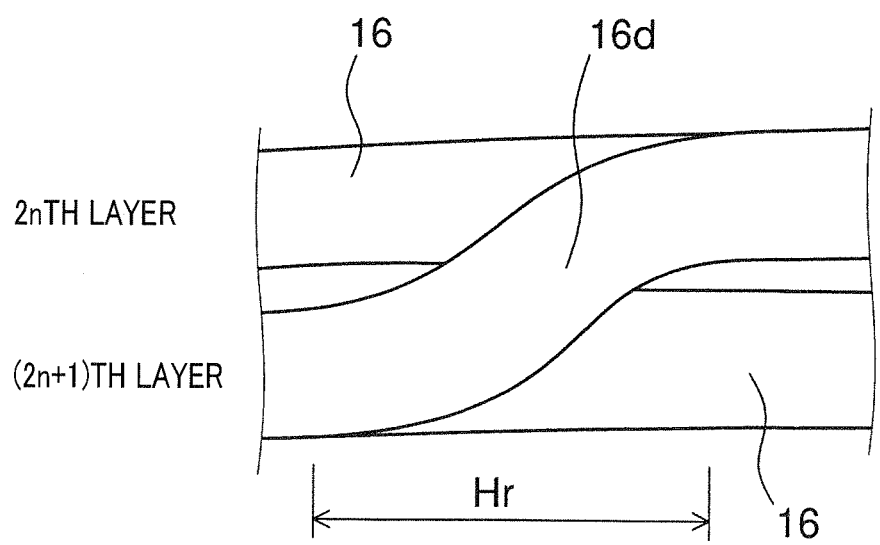
FIG. 6 is a plan view illustrating the configuration of an irregular-shaped electric conductor used for forming the stator coil.

More specifically, as shown in FIG. 6, each of the irregular-shaped electric conductors 16d is crank-shaped to connect one electric conductor 16 which is located at the 2nth layer (e.g., the second layer in the present embodiment) to another electric conductor 16 which is located at the (2n+1)th layer (e.g., the third layer in the present embodiment), where n is a natural number (e.g., equal to 1 in the present embodiment). Moreover, in FIG. 6, the irregular-shaped electric conductor 16d is located on the front side (i.e., the outer side in the axial direction of the stator core 12a), while the electric conductors 16 are located on the rear side (i.e., the inner side in the axial direction). Further, as shown in FIG. 6, in the present embodiment, the bent part of the irregular-shaped electric conductor 16d is located in a horizontal region Hr which is formed at central parts of the electric conductors 16d, thereby being prevented from interfering with the electric conductors 16d (see also FIGS. 9-11).

In the present embodiment, all of the electric conductors 16 and the irregular-shaped electric conductors 16d are connected to make up the stator coil. The stator coil is provided in the slots 12b of the stator core 12a in four layers and includes a pair of U-phase windings 16U, a pair of V-phase windings 16V and a pair of W-phase windings 16W. That is to say, in the present embodiment, the stator coil is configured as a three-phase winding.

Figure 7:
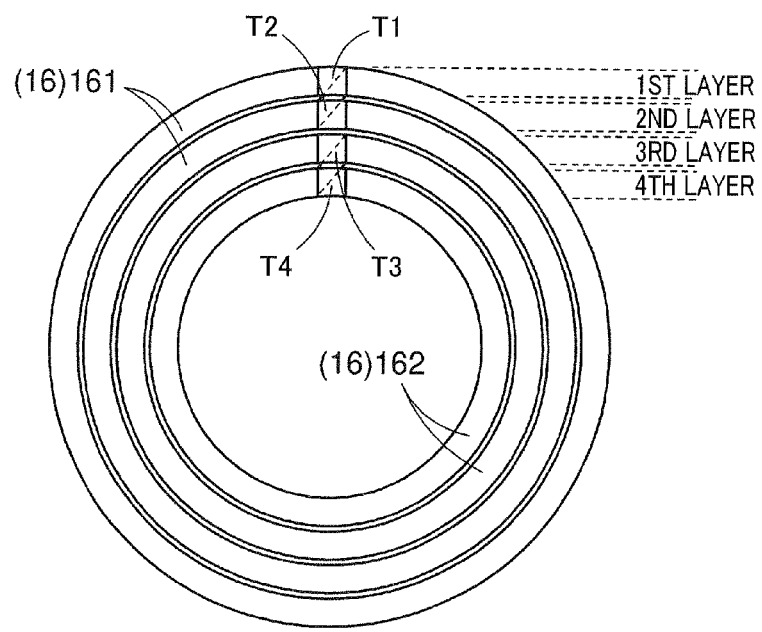
FIG. 7 is a schematic view illustrating the configuration of windings each of which is provided in two layers on a stator core of the stator.

More specifically, referring to FIG. 7, each of the U-phase, V-phase and W-phase windings 16U-16W includes a first winding 161 and a second winding 162. The first winding 161 is formed by serially connecting a predetermined number of the electric conductors 16 which are located at the first and second layers in the corresponding slots 12b of the stator core 12a. Consequently, the first winding 161 extends around the stator core 12a so as to be located at the first and second layers of the stator coil. Moreover, the first winding 161 has a terminal T1 formed at one end thereof located at the first layer and a terminal T2 formed at the other end thereof located at the second layer. On the other hand, the second winding 162 is formed by serially connecting (or joining) a predetermined number of the electric conductors 16 which are located at the third and fourth layers in the corresponding slots 12b of the stator core 12a. Consequently, the second winding 162 extends around the stator core 12a so as to be located at the third and fourth layers of the stator coil. Moreover, the second winding 162 has a terminal T3 formed at one end thereof located at the third layer and a terminal T4 formed at the other end thereof located at the fourth layer. In addition, the formation of the terminals T1-T4 is also illustrated in FIG. 4.

It should be noted that the number of the first and second windings 161 and 162 included in each of the U-phase, V-phase and W-phase windings 16U-16W of the stator coil can be set to any suitable number according to the design specification of the stator 12.

In addition, as shown in FIG. 8, the first and second windings 161 and 162 forming the U-phase, V-phase and W-phase windings 16U-16W of the stator coil can be regarded as being wave-wound around the stator core 12a.

In the present embodiment, since the slot multiplier number S is set to 2 as described previously, every adjacent two slots 12b are assigned to a same one of the three phases of the stator coil. However, for the sake of simplicity, there are shown in FIG. 8 only one of the pair of U-phase windings 16U, one of the pair of V-phase windings 16V and one of the pair of W-phase windings 16W. In addition, in FIG. 8, the odd numbers in the range of 1 to 47 indicate the numbers of the slots 12b in which the in-slot portions 19 of the U-phase, V-phase and W-phase windings 16U-16W are respectively received.

More specifically, the U-phase winding 16U which is shown in FIG. 8 is formed by connecting those of the electric conductors 16 which are received in the No. 1, No. 7, No. 13, No. 19, No. 25, No. 31, No. 37 and No. 43 slots 12b. On the other hand, the other U-phase winding 16U which is not shown in FIG. 8 is formed by connecting those of the electric conductors 16 which are received in the No. 2, No. 8, No. 14, No. 20, No. 26, No. 32, No. 38 and No. 44 slots 12b. Further, the two U-phase windings 16U are connected with each other at connecting portions Un.

Similarly, the V-phase winding 16V which is shown in FIG. 8 is formed by connecting those of the electric conductors 16 which are received in the No. 3, No. 9, No. 15, No. 21, No. 27, No. 33, No. 39 and No. 45 slots 12b. On the other hand, the other V-phase winding 16V which is not shown in FIG. 8 is formed by connecting those of the electric conductors 16 which are received in the No. 4, No. 10, No. 16, No. 22, No. 28, No. 34, No. 40 and No. 46 slots 12b. Further, the two V-phase windings 16V are connected with each other at connecting portions Vn.

The W-phase winding 16W which is shown in FIG. 8 is formed by connecting those of the electric conductors 16 which are received in the No. 5, No. 11, No. 17, No. 23, No. 29, No. 35, No. 41 and No. 47 slots 12b. On the other hand, the other W-phase winding 16W which is not shown in FIG. 8 is formed by connecting those of the electric conductors 16 which are received in the No. 6, No. 12, No. 18, No. 24, No. 30, No. 36, No. 42 and No. 48 slots 12b. Further, the two W-phase windings 16W are connected with each other at connecting portions Wn.

As described above, the U-phase, V-phase and W-phase windings 16U-16W of the stator coil are formed by connecting the electric conductors 16 received in the corresponding slots 12b of the stator core 12a. Further, the inter-layer connection (i.e., from the 2nth layer to the (2n+1)th layer) between the first and second windings 161 and 162 of the U-phase, V-phase and W-phase windings 16U-16W is made by using the irregular-shaped electric conductors 16d.

Figure 9:
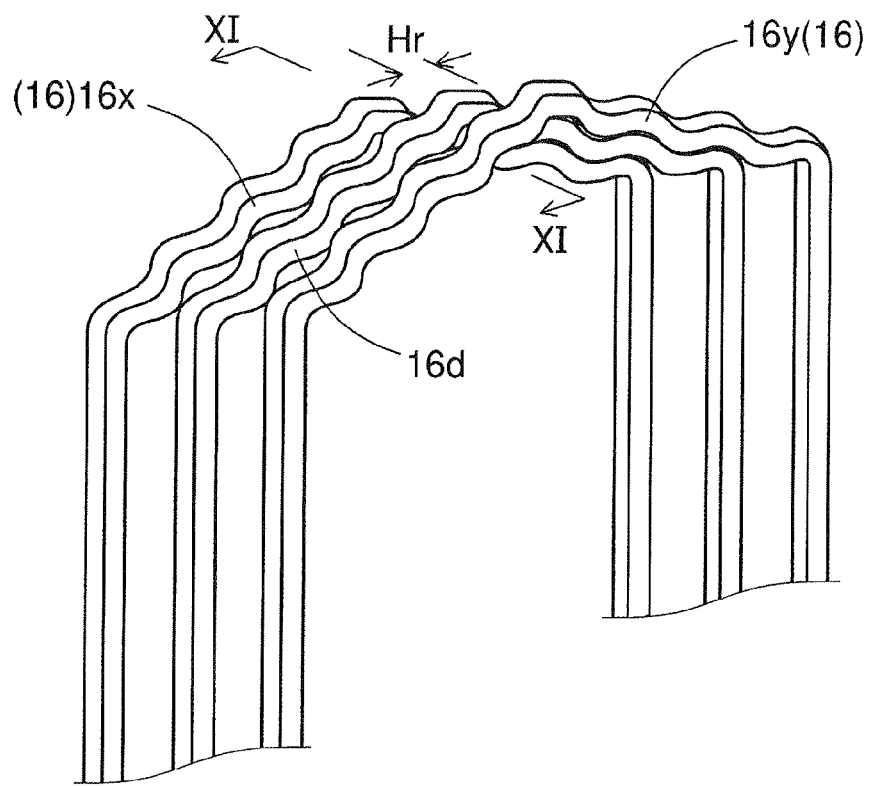
FIG. 9 is a perspective view illustrating the arrangement of the electric conductors for forming the stator coil.
Figure 10:
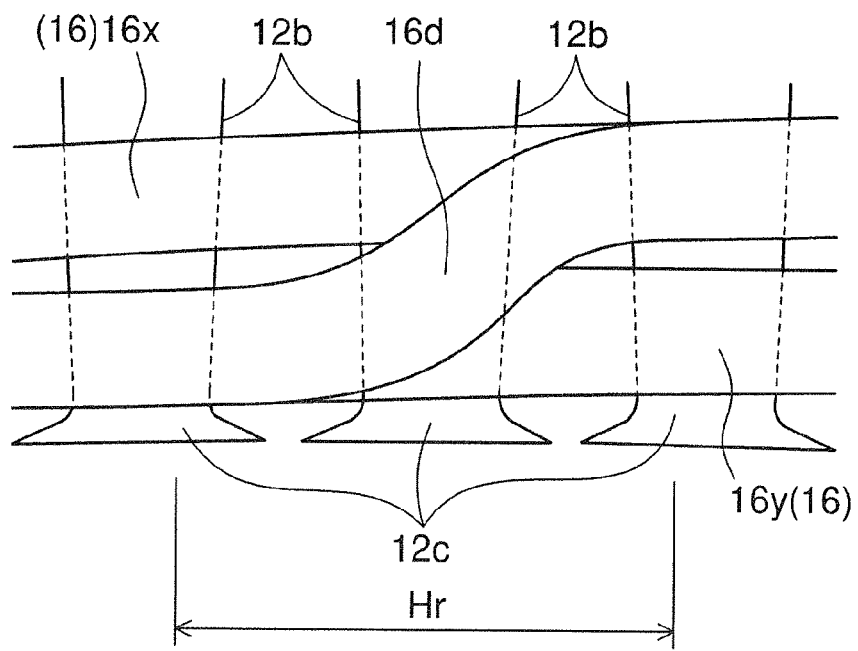
FIG. 10 is a plan view illustrating the arrangement of the electric conductors for forming the stator coil.
Figure 11:
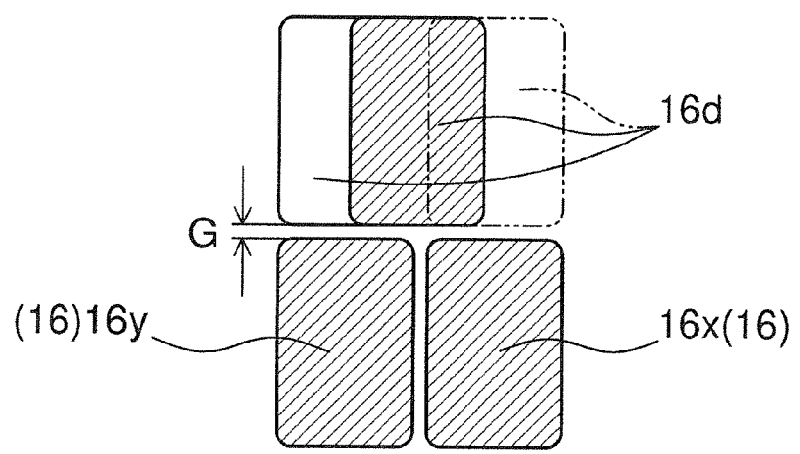
FIG. 11 is a cross-sectional view taken along the line XI-XI in FIG. 9.

For example, in FIGS. 9-11, there are shown: one of the electric conductors 16 which is located at the 2nth layer (e.g., the second layer in the present embodiment) and designated by 16x; one of the electric conductors 16 which is located at the (2n+1)th layer (e.g., the third layer in the present embodiment) and designated by 16y; and one of the irregular-shaped electric conductors 16d which makes the inter-layer connection between the first and second windings 161 and 162 of one of the U-phase, V-phase and W-phase windings 16U-16W. As seen from FIG. 10, in the present embodiment, the irregular-shaped electric conductor 16d is arranged so that the bent part of the irregular-shaped electric conductor 16d is positioned within the horizontal region Hr formed at the central parts of the electric conductors 16x and 16y. Consequently, as shown in FIG. 11, there is secured a clearance G between the irregular-shaped electric conductor 16d and the electric conductors 16x and 16y, thereby preventing interference from occurring therebetween.

Next, the inter-layer connection between the first and second windings 161 and 162 of the U-phase, V-phase and W-phase windings 16U-16W of the stator coil will be described in detail with reference to FIG. 12.

Figure 12:
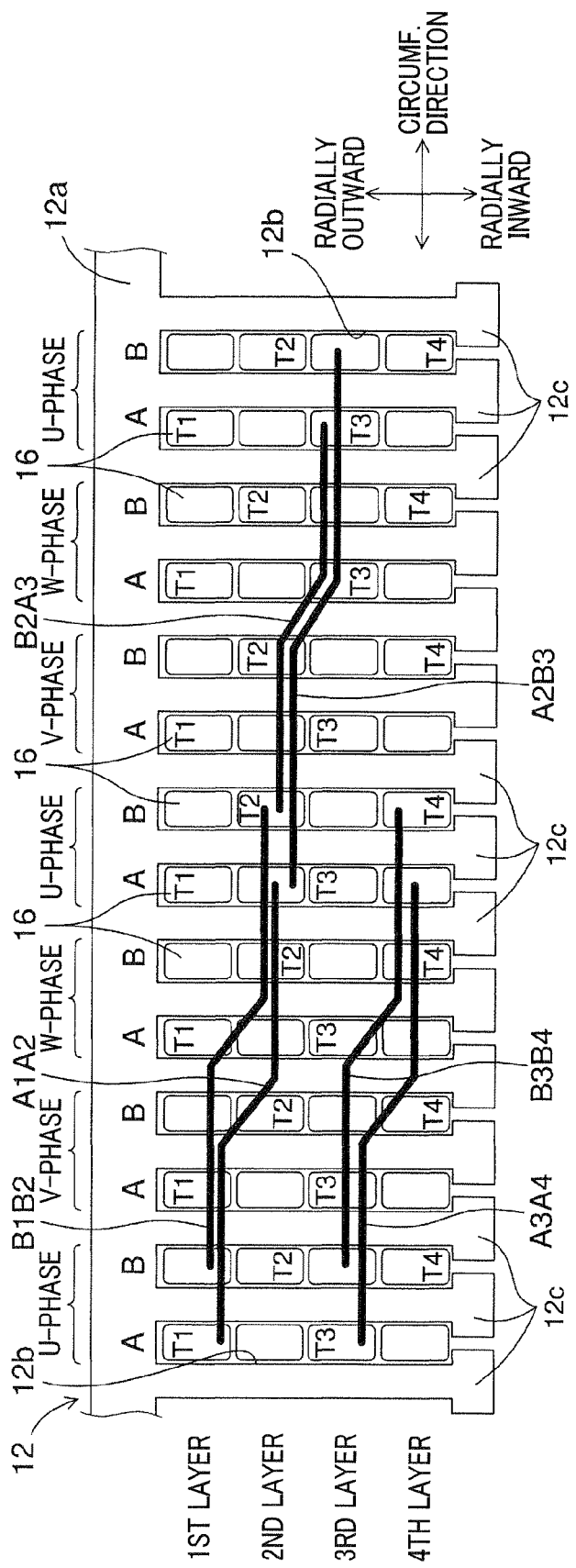
FIG. 12 is a schematic plan view illustrating the interlayer connection between the windings for forming the stator coil.

It should be noted that for the sake of simplicity and convenience, the annular (or the hollow cylindrical) stator core 12a is depicted as extending straight (i.e., as unrolled) in FIG. 12.

As shown in FIG. 12, in the present embodiment, since the slot multiplier number S is set to 2, every adjacent two slots 12b are assigned to a same one of the three phases (i.e., U, V and W phases). Moreover, the slots 12b are equally assigned to the three phases in the sequence of U, V and W; the assignment pattern repeats for every six adjacent slots 12b. Consequently, with the number of the slots 12b being equal to 48, the assignment pattern repeats eight times in the circumferential direction of the stator core 12a.

As described previously, each of the first windings 161 of the U-phase, V-phase and W-phase windings 16U-16W has the terminals T1 and T2 respectively at opposite ends thereof; each of the second windings 162 of the U-phase, V-phase and W-phase windings 16U-16W has the terminals T3 and T4 respectively at opposite ends thereof. The terminals T1-T4 can be assigned to the slots 12b in any suitable manner. For example, the terminals T1-T4 may be assigned such that some of the slots 12b have more than one terminal provided therein while the remaining slots 12b have no terminal provided therein.

The inter-layer connection may be made either by connecting two terminals which are provided in the same slot 12b or by connecting two terminals which are respectively provided in two slots 12b of the same phase via a connecting electric conductor A1A2, A3A4, B1B2 or B3B4 or an irregular-shaped connecting electric conductor A2B3 or B2A3. In addition, each of the connecting electric conductors A1A2 and B1B2 is included in one of the first windings 161 of the U-phase, V-phase and W-phase windings 16U-16W; each of the connecting electric conductors A3A4 and B3B4 is included in one of the second windings 162 of the U-phase, V-phase and W-phase windings 16U-16W; each of the irregular-shaped connecting electric conductor A2B3 and B2A3 is implemented by one of the irregular-shaped electric conductors 16d which are described previously with reference to FIGS. 6 and 9-11.

Moreover, the inter-layer connection is made in the same manner for all of the three phases. Therefore, for the sake of avoiding redundancy, the manner of making the inter-layer connection will be described hereinafter by taking only the U phase as an example. In addition, it should be noted that the term "substantially one turn" used hereinafter represents a range from 0.5 to 1 turn.

Since the slot multiplier number S is set to 2 in the present embodiment, the U-phase windings 16U are formed by connecting the electric conductors 16 received in a predetermined number of pairs of adjacent slots 12b respectively labeled [A] and [B] in FIG. 12.

As shown in FIG. 12, a terminal T1 formed at a distal end portion 16t of one of the electric conductors 16 which is located at the first layer in a slot [A] is connected, via a connecting electric conductor A1A2, to a terminal T2 formed at a distal end portion 16t of one of the electric conductors 16 which is located at the second layer in another slot [A]. Similarly, a terminal T1 formed at a distal end portion 16t of one of the electric conductors 16 which is located at the first layer in a slot [B] is connected, via a connecting electric conductor B1B2, to a terminal T2 formed at a distal end portion 16t of one of the electric conductors 16 which is located at the second layer in another slot [B]. Moreover, a terminal T3 formed at a distal end portion 16t of one of the electric conductors 16 which is located at the third layer in a slot [A] is connected, via a connecting electric conductor A3A4, to a terminal T4 formed at a distal end portion 16t of one of the electric conductors 16 which is located at the fourth layer in another slot [A]. Similarly, a terminal T3 formed at a distal end portion 16t of one of the electric conductors 16 which is located at the third layer in a slot [B] is connected, via a connecting electric conductor B3B4, to a terminal T4 formed at a distal end portion 16t of one of the electric conductors 16 which is located at the fourth layer in another slot [B].

Furthermore, as shown in FIG. 12, a terminal T2 formed at a distal end portion 16t of one of the electric conductors 16 which is located at the second layer in a slot [A] is connected, via an irregular-shaped connecting electric conductor A2B3, to a terminal T3 formed at a distal end portion 16t of one of the electric conductors 16 which is located at the third layer in a slot [B]. In other words, the terminal T2 which is formed at the other end of one of the first windings 161 is connected, via the irregular-shaped connecting electric conductor A2B3, to the terminal T3 which is formed at the one end of one of the second windings 162. Similarly, a terminal T2 formed at a distal end portion 16t of one of the electric conductors 16 which is located at the second layer in a slot [B] is connected, via an irregular-shaped connecting electric conductor B2A3, to a terminal T3 formed at a distal end portion 16t of one of the electric conductors 16 which is located at the third layer in a slot [A]. In other words, the terminal T2 which is formed at the other end of another first winding 161 is connected, via the irregular-shaped connecting electric conductor B2A3, to the terminal T3 which is formed at the one end of another second winding 162.

In addition, it should be noted that though not shown in the figures, the corresponding pairs of ends of the first and second windings 161 and 162 can also be directly connected without forming the terminals thereat.

Figure 13:
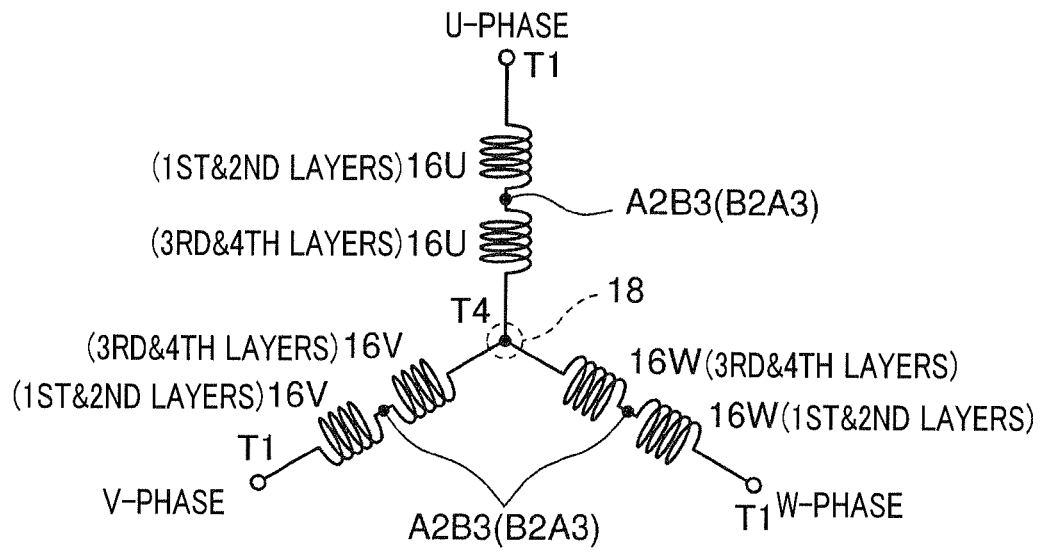
FIG. 13 is a schematic view illustrating the windings that are connected into a Y connection.
Figure 14:
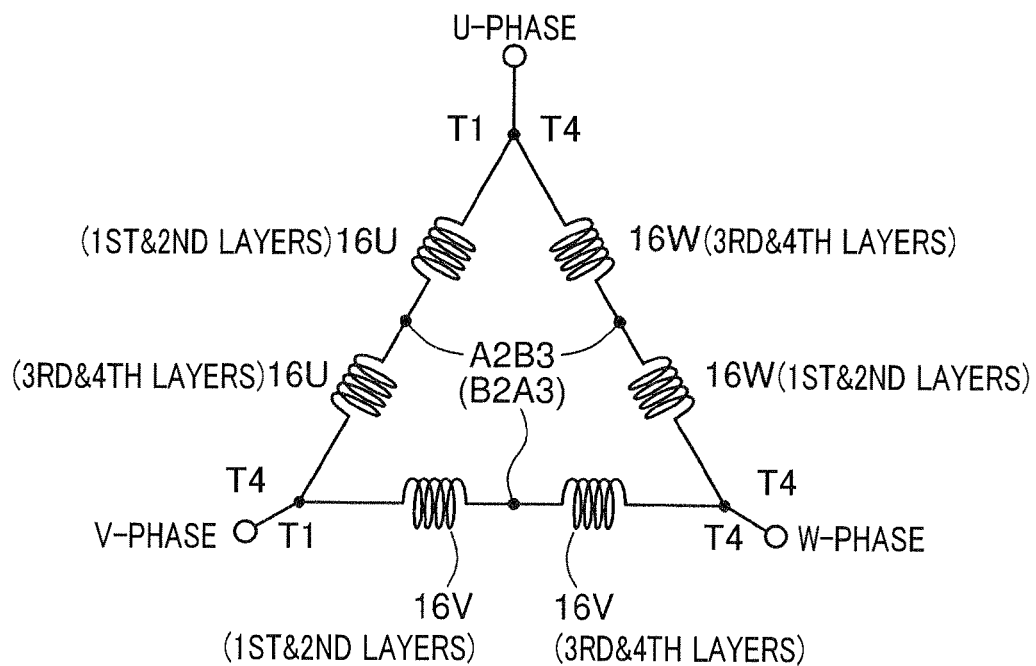
FIG. 14 is a schematic view illustrating the windings that are connected into a Δ connection.
Figure 15:
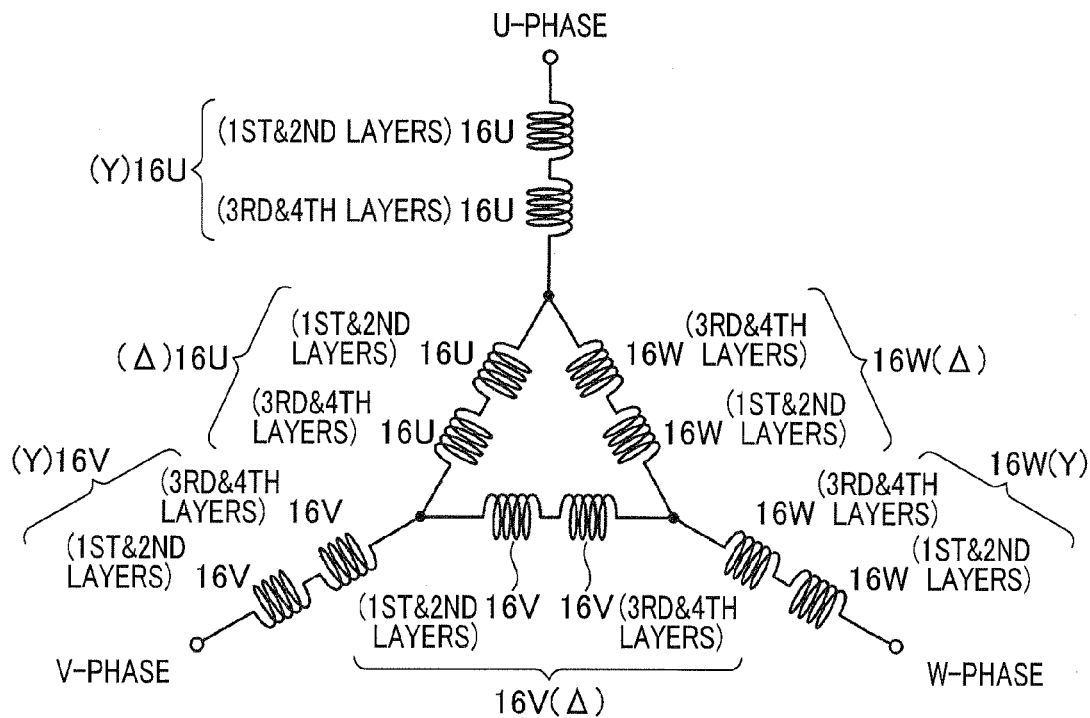
FIG. 15 is a schematic view illustrating the windings that are connected into a Y-Δ connection.

By connecting the first and second windings 161 and 162 in the above-described manner, it is possible to form any of the connections shown in FIGS. 13-15.

Specifically, in FIG. 13, for each of the U-phase, V-phase and W-phase windings 16U-16W, the first winding 161 which is located at the first and second layers is connected, via the irregular-shaped connecting electric conductor A2B3 or B2A3, to the second winding 162 which is located at the third and fourth layers. Further, the U-phase, V-phase and W-phase windings 16U-16W are connected into a Y-connection such that the terminals T1 of the phase windings 16U-16W make up output terminals of the respective phases and the terminals T4 of the phase windings 16U-16W are connected together at a neutral point 18.

In FIG. 14, for each of the U-phase, V-phase and W-phase windings 16U-16W, the first winding 161 which is located at the first and second layers is connected, via the irregular-shaped connecting electric conductor A2B3 or B2A3, to the second winding 162 which is located at the third and fourth layers. Further, the U-phase, V-phase and W-phase windings 16U-16W are connected into a Δ connection such that the terminals T1 and T4 of the phase windings 16U-16W make up output terminals of the respective phases.

In FIG. 15, for each of the U-phase, V-phase and W-phase windings 16U-16W, the first winding 161 which is located at the first and second layers is connected, via the irregular-shaped connecting electric conductor A2B3 or B2A3, to the second winding 162 which is located at the third and fourth layers. Further, all of the pair of U-phase windings 16U, the pair of V-phase windings 16V and the pair of W-phase windings 16W are connected into a Y-Δ connection. More specifically, one of the U-phase windings 16U, one of the V-phase windings 16V and one of the W-phase windings 16W are connected into a Δ connection; the remaining U-phase, V-phase and W-phase windings 16U-16W are connected to form a Y-connection outside the Δ connection.

Next, operation of the rotating electric machine 10 will be described.

As described previously, in the present embodiment, the rotating electric machine 10 is configured as a motor generator for use in a motor vehicle. Therefore, the rotating electric machine 10 selectively operates in either a motor mode or a generator mode.

In the motor mode, controlled electric power is supplied from the electric power conversion device 30 to the rotating electric machine 10, thereby energizing the stator 12. Consequently, the energized stator 12 interacts with the rotor 13 to produce torque; the torque is then outputted via the rotating shaft 20 to a rotating object (e.g., a vehicle wheel or a propeller). In addition, a power transmission mechanism may be interposed between the rotating shaft 20 and the rotating object; the power transmission mechanism includes at least one of a shaft, a cam, a pair of rack and pinion, and gears.

In the generator mode, no electric power is supplied from the electric power conversion device 30 to the rotating electric machine 10. Instead, mechanical power is transmitted from the rotating object to the rotating shaft 20 of the rotating electric machine 10, thereby causing the rotor 13 to rotate. Consequently, the rotating rotor 13 induces electromotive force (or regenerative electric power) in the stator coil of the stator 12; the electromotive force is then supplied, via the electric power conversion device 30, to a battery to charge it.

In addition, the rotating electric machine 10 may also operate in the motor mode when the rotating object is rotating. In this case, the torque generated by the rotating electric machine 10 is transmitted to the rotating object, thereby assisting the rotation of the rotating object.

According to the present embodiment, it is possible to achieve the following advantageous effects.

In the present embodiment, the stator 12 includes the hollow cylindrical stator core 12a and the three-phase stator coil. The stator core 12a has the 48 slots 12b formed therein; the slots 12b are arranged in the circumferential direction of the stator core 12a at the predetermined intervals. The stator coil is mounted on the stator core 12a in four layers in the radial direction of the stator core 12a. The stator coil is comprised of the U-phase, V-phase and W-phase windings 16U-16W. Each of the U-phase, V-phase and W-phase windings 16U-16W includes the first and second windings 161 and 162. The first winding 161 extends around the stator core 12a by two turns so as to be located at the (2n−1)th and 2nth layers (i.e., the first and second layers in the present embodiment) of the stator coil. The first winding 161 has the one end located at the (2n−1)th layer and the other end located at the 2nth layer. The second winding 162 extends around the stator core 12a by two turns so as to be located at the (2n+1)th and (2n+2)th layers (i.e., the third and fourth layers in the present embodiment) of the stator coil. The second winding 162 has the one end located at the (2n+1)th layer and the other end located at the (2n+2)th layer. The other end of the first winding 161 and the one end of the second winding 162, which are respectively located at the 2nth and (2n+1)th layers, are electrically connected to each other.

With the above configuration, the lengths of the first and second windings 161 and 162 are equal for all the U-phase, V-phase and W-phase windings 16U-16W. Consequently, it is possible to make all the lengths of the U-phase, V-phase and W-phase windings 16U-16W equal to each other, thereby making all the voltage drops across the phase-windings 16U-16W equal to each other.

Moreover, with the above configuration, the U-phase, V-phase and W-phase windings 16U-16W can be connected in various ways by suitably connecting the first and second windings 161 and 162 of the phase windings 16U-16W. In other words, the stator coil can have various winding connections. As a result, the rotating electric machine 10 can be used with a high-voltage power source (e.g., a battery pack or fuel cell pack).

In the present embodiment, each of the first and second windings 161 and 162 is formed by connecting the electric conductors 16 inserted in the slots 12b of the stator core 12a. Moreover, each of the first and second windings 161 and 162 includes the in-slot portions 19, which are received in the corresponding slots 12b of the stator core 12a, and the turn portions 14 that connect adjacent pairs of the in-slot portions 19 and are located outside of the slots 12b of the stator core 12a.

With the above configuration, it is possible to easily form the first and second windings 161 and 162 by first inserting the electric conductors 16 in the slots 12b of the stator core 12a and then connecting the electric conductors 16.

In the present embodiment, the other end of the first winding 161 and the one end of the second winding 162, which are respectively located at the 2nth and (2n+1)th layers, are electrically connected to each other via one of the irregular-shaped electric conductors 16d that are different in shape from the electric conductors 16 forming the first and second windings 161 and 162.

Consequently, it is possible to locate the bent part of the irregular-shaped electric conductor 16d in the horizontal region Hr formed at the central parts of the adjacent electric conductors 16d, thereby preventing interference between the irregular-shaped electric conductor 16d and the adjacent electric conductors 16d. As a result, it is possible to prevent the insulating coats 16r of the electric conductors 16d and 16 from being damaged due to interference therebetween.

In the present embodiment, each of the turn portions 14 of the first and second windings 161 and 162 is stair-shaped so that the turn portion 14 has the maximum protruding height from the corresponding axial end face of the stator core 12a at the center of the turn portion 14.

With such a stair-shape, it is possible to easily interlace the turn portions 14 of the first and second windings 161 and 162 with one another. It is also possible to make the first winding 161 extend around the stator core 12a by two turns so as to be located at the (2n−1)th and 2nth layers and the second winding 162 extend around the stator core 12a by two turns so as to be located at the (2n+1)th and (2n+2)th layers.

Further, in the present embodiment, each of the stair-shaped turn portions 14 of the first and second windings 161 and 162 includes the plurality of steps. The height H of each of the steps is set to be substantially equal to the thickness Th of the electric conductors 16 forming the first and second windings 161 and 162.

Setting the height H as above, it is possible to easily stack the turn portions 14 of the first and second windings 161 and 162 in the axial direction of the stator core 12a.

In the present embodiment, each of the electric conductors 16 forming the first and second windings 161 and 162 is configured to include the electrically-conductive metal member 16m having the substantially rectangular cross section and the insulating coat 16r that covers the metal member 16m.

With the above configuration, it is possible to electrically insulate the in-slot portions 19 of the first and second windings 161 and 162 received in the slots 12b of the stator core 12a from each other without employing any additional insulator.

In the present embodiment, each of the turn portions 14 of the first and second windings 161 and 162 has the crank-shaped portion 14c formed therein.

With the crank-shape portions 14c of the turn portions 14, it is possible to easily radially offset the turn portions 14 from one another.

In the present embodiment, for every two layers of the stator coil, the terminals T1-T4 are formed at the ends of the first and second windings 161 and 162 of the U-phase, V-phase and W-phase windings 16U-16W. The U-phase, V-phase and W-phase windings 16U-16W are connected into one of a Y-connection, a Δ connection and a Y-Δ connection by connecting corresponding pairs of the terminals T1-T4.

With the above configuration, it is possible to connect the U-phase, V-phase and W-phase windings 16U-16W into any of the above-described connections while making all the phase voltages equal to each other.

In the present embodiment, the rotating electric machine 10 includes the stator 12 as described above and the rotor 13 that is rotatably disposed radially inside of the stator 12.

Consequently, it is possible to diversify electric connection of the rotating electric machine 10 while making all the phase voltages of the rotating electric machine 10 equal to each other.

While the above particular embodiment has been shown and described, it will be understood by those skilled in the art that various modifications, changes, and improvements may be made without departing from the spirit of the invention.

In the previous embodiment, the slot multiplier number S is set to 2 (see FIGS. 2 and 12). However, the slot multiplier number S may be set to other natural numbers such as 1, 3 or more.

Figure 16:
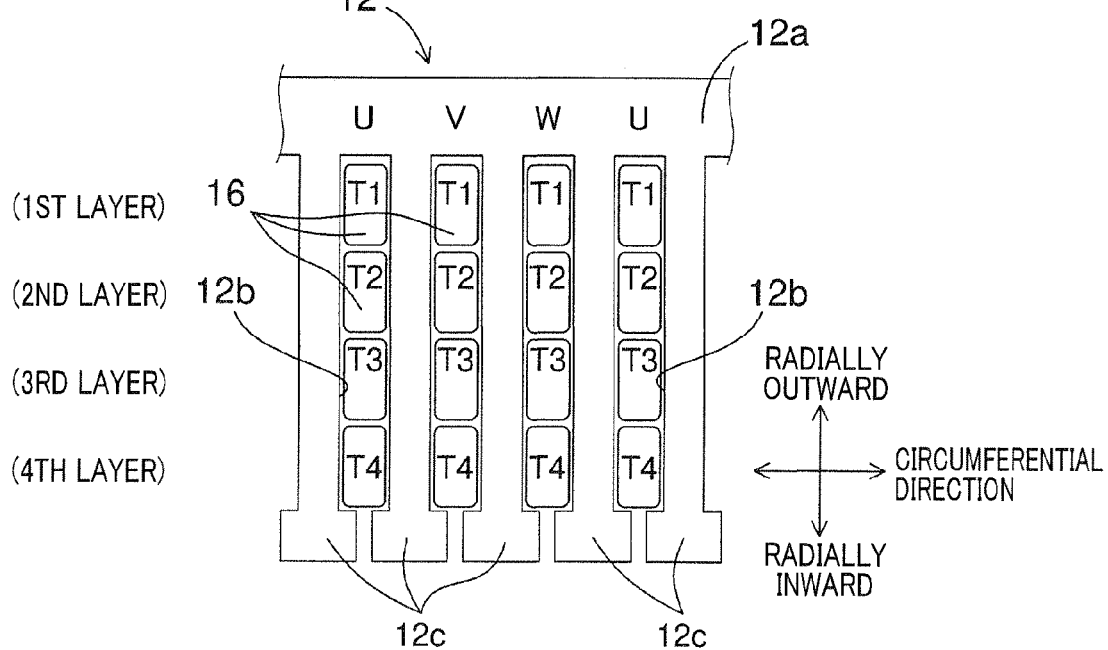
FIG. 16 is a schematic plan view illustrating the provision of terminals in a stator according to a modification.

For example, referring to FIG. 16, when the slot multiplier number S is set to 1, each of the slots 12b of the stator core 12a is assigned to one of the three phases (i.e., U, V and W phases) so that any adjacent two slots 12b belong to different phases. Moreover, every three adjacent slots 12b are sequentially assigned to the U, V and W phases; the assignment pattern repeats 16 times in the circumferential direction of the stator core 12a.

In the previous embodiment, the stator coil is provided in the slots 12b of the stator core 12a in four layers. Moreover, for each of the U-phase, V-phase and W-phase windings 16U-16W, the first winding 161 extends around the stator core 12a so as to be located at the first and second layers (i.e., the (2n−1)th and 2nth layers with n being equal to 1); the second winding 162 extends around the stator core 12a so as to be located at the third and fourth layers (i.e., the (2n+1)th and (2n+2)th layers with n being equal to 1). Furthermore, the ends of the first and second windings 161 and 162, which are respectively located at the second and third layers (i.e., the 2nth and (2n+1)th layers with n being equal to 1), are electrically connected to each other. That is to say, in the previous embodiment, n is only limited to 1.

However, n may be other natural numbers such as 2 or 3. For example, though not shown in the figures, the stator coil may be provided in the slots 12b of the stator core 12a in eight layers. In this case, each of the U-phase, V-phase and W-phase windings 16U-16W further includes a third winding 163 and a fourth winding 164 in addition to the first and second windings 161 and 162. The third winding 163 extends around the stator core 12a so as to be located at the fifth and sixth layers (i.e., the (2n−1)th and 2nth layers with n being equal to 3). The second winding 162 extends around the stator core 12a so as to be located at the seventh and eighth layers (i.e., the (2n+1)th and (2n+2)th layers with n being equal to 3). Further, the ends of the third and fourth windings 163 and 164, which are respectively located at the sixth and seventh layers (i.e., the 2nth and (2n+1)th layers with n being equal to 3), are electrically connected to each other. That is to say, in the previous embodiment, n is in the range of 1 to 3.

In the previous embodiment, for every two layers (i.e., for every 2m layers with m being equal to 1) of the stator coil, the terminals T1-T4 are formed at the ends of the first and second windings 161 and 162 of the U-phase, V-phase and W-phase windings 16U-16W.

However, when the stator coil is provided in the slots 12b of the stator core 12a in, for example, eight layers, it is possible to form the terminals at the ends of the windings for every four layers (i.e., for every 2m layers with m being equal to 2). That is to say, m may be any natural number.

In the previous embodiment, the stator coil is configured as a three-phase coil to include the U-phase, V-phase and W-phase windings 16U-16W; each of the phase windings 16U-16W includes the first and second windings 161 and 162.

However, the stator coil may be configured as a single-phase coil which includes the first and second windings 161 and 162. Otherwise, the stator coil may also be configured as a stator coil having more than three phases.

For example, the stator coil may be configured as a six-phase coil which includes U-phase, V-phase, W-phase, X-phase, Y-phase and Z-phase windings. In this case, each of the phase windings includes the first and second windings

161 and 162 as described above. Further, the U-phase, V-phase and W-phase windings are connected into one of the three connections as shown FIGS. 13-15, while the X-phase, Y-phase and W-phase windings are also connected into one of the three connections. Furthermore, the connection formed by the U-phase, V-phase and W-phase windings may be electrically connected with the connection formed by the X-phase, Y-phase and W-phase windings; in this case, both the connections can be energized by the single electric power conversion device 30. Otherwise, the connection formed by the U-phase, V-phase and W-phase windings may be electrically separated from the connection formed by the X-phase, Y-phase and W-phase windings; in this case, it is necessary to employ two electric power conversion devices 30 for respectively energizing the two connections.

In the previous embodiment, each of the first and second windings 161 and 162 is formed by connecting the predetermined number of the electric conductors 16. However, each of the first and second windings 161 and 162 may also be formed of a single electric wire that is wound around the stator core 12*a* so as to be located at the corresponding layers in the corresponding slots 12*b* of the stator core 12*a*.

In the previous embodiment, the invention is directed to the stator 12 for the inner rotor-type rotating electric machine 10. However, the invention can also be applied to a stator for an outer rotor-type rotating electric machine in which a rotor of the machine is rotatably disposed radially outside of the stator.

Moreover, in the previous embodiment, the invention is directed to the stator 12 for the rotating electric machine 10 which is configured as a motor generator. However, the invention can also be applied to a stator for an electric motor or a stator for an electric generator.

What is claimed is:

1. A stator comprising:
   a hollow cylindrical stator core having a plurality of slots formed therein, the slots being arranged in a circumferential direction of the stator core at predetermined intervals; and
   a stator coil provided in the slots of the stator core in a plurality of layers in a radial direction of the stator core, wherein
   the stator coil includes a first winding and a second winding,
   the first winding extends around the stator core by two turns so as to be located at the (2n−1)th and 2nth layers of the stator coil counting from a radially outer side of the stator coil, where n is a natural number, the first winding having an end located at the 2nth layer,
   the second winding extends around the stator core by two turns so as to be located at the (2n+1)th and (2n+2)th layers of the stator coil, the second winding having an end located at the (2n+1)th layer,
   the ends of the first and second windings, which are respectively located at the 2nth and (2n+1)th layers, are electrically connected to each other,
   each of the first and second windings is formed by connecting a plurality of electric conductors inserted in the slots of the stator core,
   each of the first and second windings includes a plurality of in-slot portions, which are received in corresponding ones of the slots of the stator core, and a plurality of turn portions that connect adjacent pairs of the in-slot portions and are located outside of the slots of the stator core,
   the ends of the first and second windings are electrically connected to each other via an irregular-shaped electric conductor that is different in shape from the electric conductors forming the first and second windings,
   the irregular-shaped electric conductor protrudes axially outward from both the first and second windings,
   the stator coil is configured as a multi-phase coil to include a plurality of phase windings,
   each of the phase windings includes the first and second windings,
   for every 2m layers of the stator coil, there are formed terminals at the ends of the first and second windings of the phase windings, where m is a natural number, and
   the phase windings are connected into one of a Y-connection, a Δ connection and a Y-Δ connection by connecting corresponding pairs of the terminals.

2. The stator as set forth in claim 1, wherein each of the turn portions of the first and second windings is stair-shaped so that the turn portion has a maximum protruding height from a corresponding axial end face of the stator core at a center of the turn portion.

3. The stator as set forth in claim 2, wherein each of the stair-shaped turn portions of the first and second windings includes a plurality of steps, and
   each of the steps has a height substantially equal to a thickness of the electric conductors forming the first and second windings.

4. The stator as set forth in claim 1, wherein each of the electric conductors forming the first and second windings is configured to include an electrically-conductive metal member having a substantially rectangular cross section and an insulating coat that covers the metal member.

5. The stator as set forth in claim 1, wherein each of the turn portions of the first and second windings has a crank-shaped portion formed therein.

6. A rotating electric machine comprising the stator as set forth in claim 1 and a rotor that is rotatably disposed in radial opposition to the stator.

7. The stator as set forth in claim 1, wherein for each of the first and second windings, the in-slot portions of the winding are spaced from one another at equal intervals in the circumferential direction of the stator core.

8. The stator as set forth in claim 1, wherein the two turns around the stator core of the first winding are electrically continuous, and the two turns around the stator core of the second winding are electrically continuous.

9. A stator comprising:
   a hollow cylindrical stator core having a plurality of slots formed therein, the slots being arranged in a circumferential direction of the stator core at predetermined intervals; and
   a stator coil provided in the slots of the stator core in a plurality of layers in a radial direction of the stator core, wherein
   the stator coil includes a first winding and a second winding,
   the first winding extends twice around the stator core so as to be located at the (2n−1)th and 2nth layers of the stator coil counting from a radially outer side of the stator coil, where n is a natural number, the first winding having an end located at the 2nth layer,
   the second winding extends twice around the stator core so as to be located at the (2n+1)th and (2n+2)th layers of the stator coil, the second winding having an end located at the (2n+1)th layer,
   the ends of the first and second windings, which are respectively located at the 2nth and (2n+1)th layers, are electrically connected to each other;

the first winding extends a first time around the stator core at the (2n−1)th layer and then electrically in series with a second time around the stator core at the 2nth layer, and the second winding extends a first time around the stator core at the (2n+1)th layer and then electrically in series with a second time around the stator core at the (2n+2)th layer.

* * * * *